(No Model.)
C. B. VON BIEDENFELD.
JOURNAL BEARING.
No. 576,252. Patented Feb. 2, 1897.
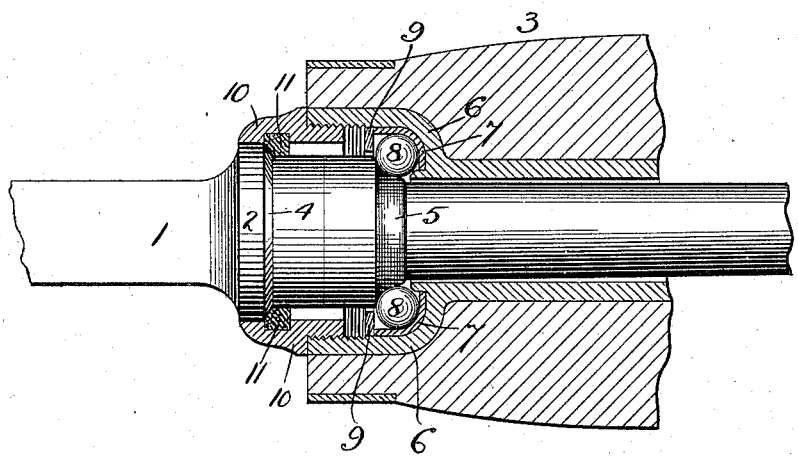
Witnesses
Inventor
Curt B. von Biedenfeld
By Elliott & Hopkins
Attys.

UNITED STATES PATENT OFFICE.

CURT B. VON BIEDENFELD, OF CHICAGO, ILLINOIS, ASSIGNOR TO THE IMPERIAL BALL BEARING AXLE COMPANY, OF SAME PLACE.

JOURNAL-BEARING.

SPECIFICATION forming part of Letters Patent No. 576,252, dated February 2, 1897.

Application filed April 24, 1896. Serial No. 588,859. (No model.)

*To all whom it may concern:*

Be it known that I, CURT B. VON BIEDENFELD, a subject of the Emperor of Germany, residing at Chicago, in the county of Cook and State of Illinois, have invented certain new and useful Improvements in Journal-Bearings, of which the following is a full, clear, and exact specification.

My invention relates to devices for rendering a journal-bearing inaccessible to dust, moisture, or other foreign substances, but is especially designed for use in connection with antifriction devices at the inner end of the hubs of vehicles.

The object of my invention is to have a perfectly-tight dust and water proof connection between the hub and axle of the vehicle and of such character that there will be no substantial increase of friction between these two members, that is readily renewable when worn, and so constructed that it will not interfere in any manner with the antifriction devices between the hub and axle. These objects are attained by devices illustrated in the drawing, in which is shown a longitudinal section of a hub, with the axle shown in full lines, of devices embodying my invention.

Similar numerals of reference indicate the same parts in the drawing.

1 represents an axle provided with a shoulder 2 at a point inwardly beyond a hub 3, which shoulder is provided with a bevel 4 on its side opposing the hub, which side, however, may be at a right angle to the axis of the axle. The axle 1 is also provided at a point within the hub with a beveled bearing 5, between which and a shell 6 within the hub or a suitable trackway 7 the balls 8 have their bearing, said balls being held in place by a ring 9. The outer and enlarged end of the shell 6 is provided with internal screw-threads, in which is fitted a collar 10, which at its outer end fits closely around the shoulder 2 on the axle 1, the said collar being provided with an annular groove or other suitable retaining device for a ring-packing 11, of rubber, felt, or other fibrous material, adapted to form a tight joint between the collar 10 and the shoulder 2 of the axle and the body or straight portion of the axle, but preferably between the inclined side of the shoulder 2 and the adjacent straight portion of the axle, and all this without substantially creating or causing any friction between the hub, and particularly the collar 10 and the axle. The tightly joining of the collar 10 with the shell and the packing therein, so arranged as to form a dust and water proof joint between the hub and the axle in such a manner as to absolutely exclude dust and water from the antifriction devices between the hub and axle and without obstructing accessibility to and the operation of the antifriction devices, or substantially increasing friction between the axle and the hub, is the essential feature of my present invention, and it would be no departure therefrom to omit the shoulder 2 entirely, for so long as the packing or gasket 11 forms a dust and water proof joint between the axle and the collar 10 the particular construction of the axle is immaterial. The ring 11 is let into the collar 10, as shown, so that it will come and go with the collar when the collar is adjusted. In practice, however, I prefer to employ the shoulder and also have its inner side beveled, with the packing embracing both this bevel and the straight portion of the axle, as shown in the drawing, for the reason that an angular joint is thereby formed between the packing and the axle, which by reason of its angularity promotes the effectiveness of the joint. As shown, the packing or gasket is confined and held by an annular groove in the collar 10, so as to turn with the hub; but it would be no departure from my invention to secure the packing or gasket to the axle and to have the hub revolve around it, nor would it be a departure from my invention to dovetail the packing in the cap or axle or to secure it in any other manner capable of holding it in its operative position.

My invention is not limited to the use of a dust-proof device in connection with antifriction devices such as shown, although it is proposed to use it in such a connection, but includes its use, and particularly at the inner end of a hub, when such antifriction devices are entirely absent.

Having described my invention, what I claim as new, and desire to secure by Letters Patent, is as follows:

The combination with an axle having a cone thereon and an axle-box surrounding said axle and containing antifriction-balls bearing upon said cone and said box being provided with screw-threads at its extremity, of a dust-excluding collar screwing into said screw-threads of the box and being provided with an internal annular groove, the packing-ring 11 let into and carried by said groove so as to move back and forth with said collar when the latter is adjusted, the shoulder 2 on the axle having a beveled edge against which said packing-ring abuts and said shoulder being surrounded by said collar, substantially as set forth.

CURT B. VON BIEDENFELD.

Witnesses:
JNO. G. ELLIOTT,
H. F. PROBERT.